(12) United States Patent
Phillis et al.

(10) Patent No.: US 6,517,089 B2
(45) Date of Patent: Feb. 11, 2003

(54) TORSION BAR ACTUATOR FOR SUSPENSION TRIM HEIGHT AND ROLL CONTROL

(75) Inventors: Robert L. Phillis, Covington, OH (US); Scott A. Stacey, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/881,417

(22) Filed: Jun. 14, 2001

(65) Prior Publication Data

US 2002/0190486 A1 Dec. 19, 2002

(51) Int. Cl.[7] .............................................. B60G 17/00
(52) U.S. Cl. ................................. 280/6.157; 280/5.586
(58) Field of Search ........................ 280/5.506, 5.507, 280/5.509, 5.511, 6.157, 124.103, 124.104, 124.106, 134, 137

(56) References Cited

U.S. PATENT DOCUMENTS

| | | | | | |
|---|---|---|---|---|---|
| 3,559,499 A | * | 2/1971 | Profet | ........................ | 74/411.5 |
| 3,901,529 A | * | 8/1975 | Kolbe | ........................ | 267/279 |
| 4,042,258 A | * | 8/1977 | Cislo | ........................ | 267/273 |
| 4,143,887 A | * | 3/1979 | Williams et al. | ............ | 267/190 |
| 4,153,272 A | * | 5/1979 | Fielder et al. | ........ | 280/124.106 |
| 4,358,143 A | * | 11/1982 | Cullen | ........................ | 242/533 |
| 4,781,364 A | * | 11/1988 | Finn et al. | .................... | 267/260 |
| 4,854,603 A | * | 8/1989 | Scaduto | ............... | 280/124.104 |
| 5,161,822 A | * | 11/1992 | Lund | ........................ | 137/625.69 |
| 5,549,322 A | * | 8/1996 | Hauri | ........................ | 180/209 |
| 5,597,180 A | * | 1/1997 | Ganzel | ............... | 280/124.106 |
| 5,630,623 A | * | 5/1997 | Ganzel | ............... | 280/124.106 |
| 5,641,175 A | * | 6/1997 | Maeda et al. | ................ | 267/273 |
| 5,839,741 A | * | 11/1998 | Heyring | ............... | 280/124.106 |
| 6,022,030 A | * | 2/2000 | Fehring | ........................ | 267/277 |
| 6,175,792 B1 | * | 1/2001 | Jones et al. | .............. | 280/5.507 |
| 6,176,496 B1 | * | 1/2001 | Busch | ................. | 280/124.159 |
| 6,340,152 B1 | * | 1/2002 | Ritchie et al. | .............. | 188/300 |

FOREIGN PATENT DOCUMENTS

DK 0044579 A1 * 9/1981 .......... B60G/21/04

* cited by examiner

Primary Examiner—Brian L. Johnson
Assistant Examiner—Kelly E Campbell
(74) Attorney, Agent, or Firm—Scott A. McBain

(57) ABSTRACT

A suspension for a motor vehicle comprises a control arm connected to each of a pair of wheels, a torsion bar, and a height actuator. The torsion bar is connected to each control arm, and is rotatable in first and second directions. The height actuator is connected between the torsion bars, and is operable to lower a sprung mass of the vehicle by rotating the torsion bars in the first directions, and to raise the sprung mass by rotating the torsion bars in the second directions. A roll actuator is also connected between the height actuator and the sprung mass.

18 Claims, 3 Drawing Sheets

TORSION BAR ACTUATOR FOR SUSPENSION TRIM HEIGHT AND ROLL CONTROL

TECHNICAL FIELD OF THE INVENTION

The present invention relates to motor vehicle suspensions, and more particularly to a torsion bar actuator for trim height and roll control.

BACKGROUND OF THE INVENTION

Motor vehicles are subject to road impacts, and to rolling when cornering. In order to separate the occupants of the vehicle from the effects of these forces to the greatest extent possible, vehicles are typically equipped with suspension systems that divide the vehicle between a sprung portion and an unsprung portion. A normal compromise in such vehicle suspension systems is between ride comfort and handling.

One type of vehicle suspension includes a torsion bar. The torsion bar usually extends generally perpendicular to the axis of rotation of a wheel of the vehicle, and twists to resist the forces applied to the wheel during road impacts or cornering. U.S. Pat. No. 4,540,197, for example, shows a vehicle wheel suspension that includes transverse control arms for an opposed pair of road wheels and a primary suspension spring beam spaced longitudinally of the vehicle away from the control arms and interconnected therewith by torsion rods installed on axes located outboard of the swing axes of the transverse control arms. Similarly, U.S. Pat. Nos. 4,042,258, 4,143,887, 4,153,272, and 6,086,162 show other torsion bar suspensioning arrangements.

SUMMARY OF THE INVENTION

The present invention is a suspension for a motor vehicle. The suspension comprises a control arm connected to each of a pair of wheels, a torsion bar, and a height actuator. The torsion bar is connected to each control arm, and is rotatable in first and second directions. The height actuator is connected between the torsion bars, and is operable to lower a sprung mass of the vehicle by rotating the torsion bars in the first directions, and to raise the sprung mass by rotating the torsion bars in the second directions. A roll actuator is also connected between the height actuator and the sprung mass.

Accordingly, it is an object of the present invention to provide a suspension of the type described above which allows the trim height of the vehicle to be adjusted.

Another object of the present invention is to provide a suspension of the type described above which resists vehicle roll during cornering.

Still another object of the present invention is to provide a suspension of the type described above which allows the trim height and/or roll control actuators to be packaged remotely from the vehicle wheels.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
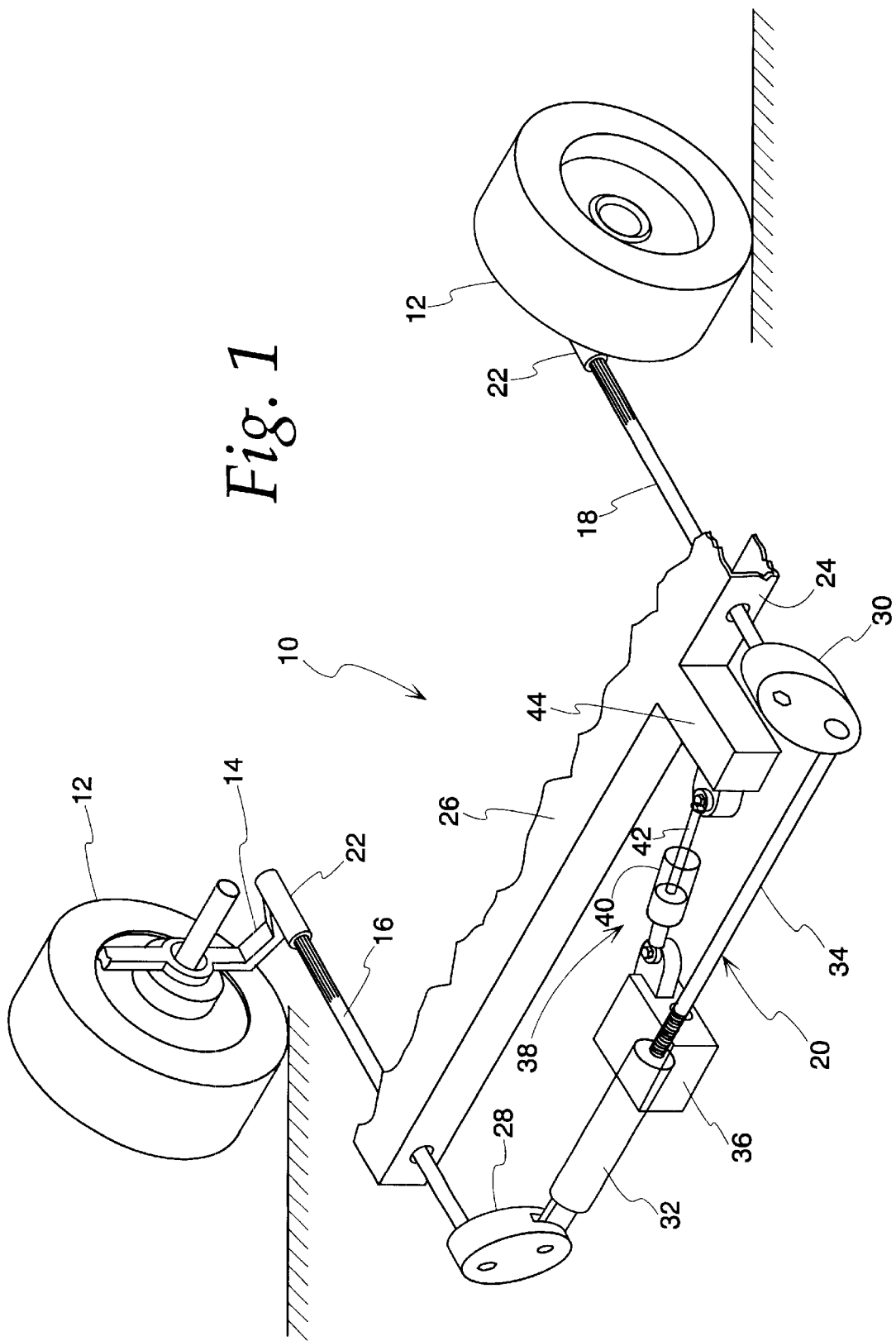
FIG. 1 is a schematic view of a suspension according to the present invention for a motor vehicle.

FIG. 1 shows a suspension assembly 10 according to the present invention for a motor vehicle having a pair of wheels 12. The wheels 12 can be either front or rear wheels for the vehicle. The suspension assembly 10 comprises a lower control arm 14 connected to each of the wheels 12, torsion bars 16 and 18, and a jack screw system 20. The torsion bars 16 and 18 are connected to their respective control arm 14 by conventional splined connections 22. As is well known, upward vertical displacement of a wheel 12 thus causes its associated torsion bar to rotate in a first direction, i.e. the torsion bar 16 to rotate clockwise as shown, or the torsion bar 18 to rotate in the opposite, counterclockwise direction. Conversely, downward vertical displacement of a wheel 12 causes its associated torsion bar to rotate in a second direction, i.e. the torsion bar 16 to rotate counterclockwise, or the torsion bar 18 to rotate clockwise as shown.

The torsion bars 16 and 18 extend through a yoke portion 24 of a sprung portion 26 of the vehicle, and are fixedly connected to torque reaction arms 28 and 30, respectively. The torque reaction arm 28, in turn, is pivotably connected to an outer portion 32 of the jack screw system 20. Similarly, the torque reaction arm 30 is pivotably connected to an inner portion 34 of the jack screw system 20. The inner and outer portions of the jack screw system nest with each other as shown.

A motor assembly 36 is connected to the jack screw system 20. In a preferred embodiment, the motor assembly 36 is fixed to the outer jack screw 32, and includes an electric motor, a reduction gearbox, and a low-friction drive such as a ball screw type drive. The motor assembly 36 is operable to adjust the trim height of the sprung mass 26. Thus, the motor assembly 36 lowers the sprung mass 26 of the vehicle by rotating the torsion bars 16 and 18 in the first directions, and raises the sprung mass 26 by rotating the torsion bars in the second directions.

Figure 2:
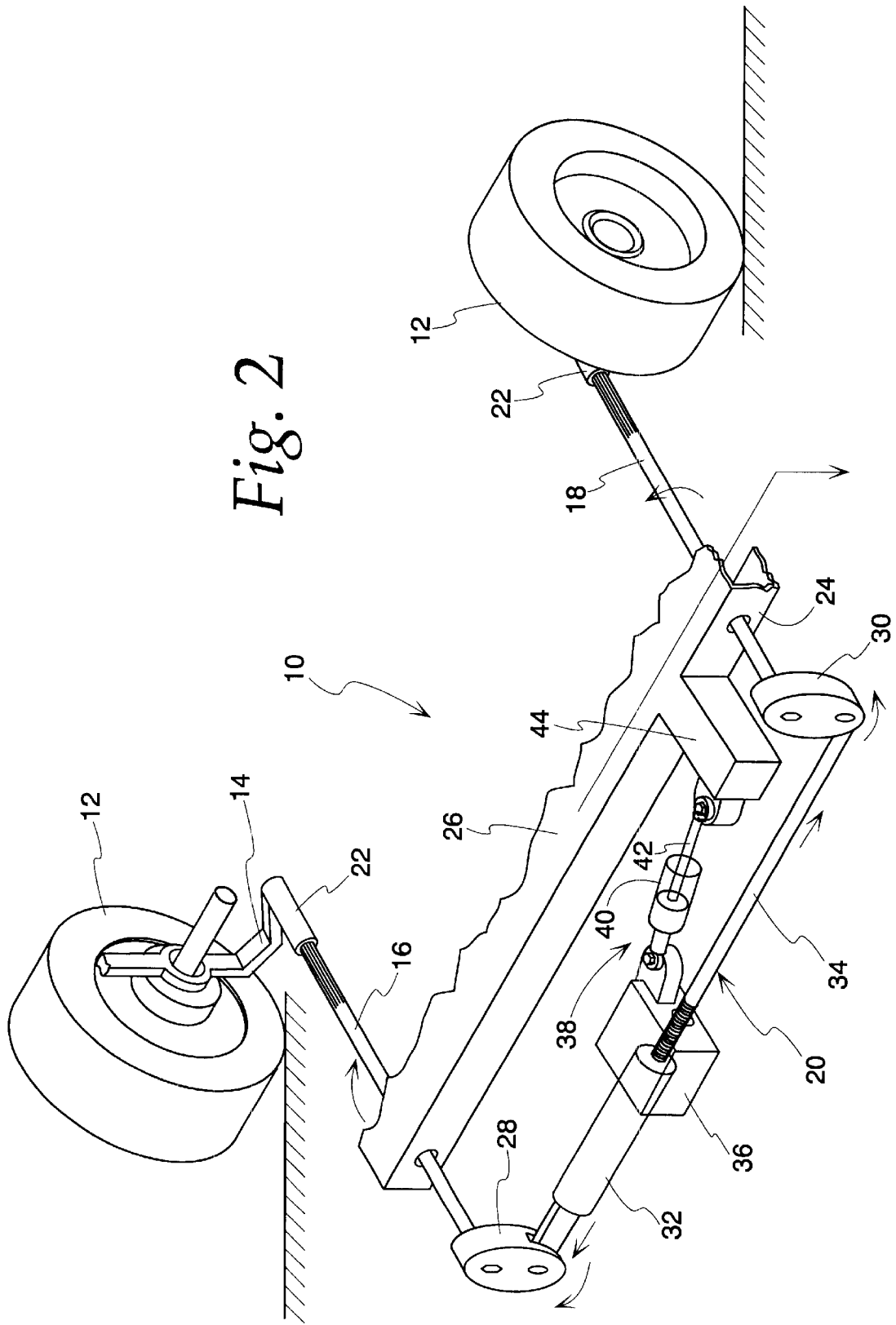
FIG. 2 is a schematic view of the suspension showing a sprung portion of the vehicle with a lowered trim height.

The first direction, as used herein, is thus defined as bar 16 being rotated in the clockwise fashion and bar 18 being rotated in the counterclockwise direction as indicated by arrows about bars 16, 18 in FIG. 2. In other words, the first direction produces an inward rolling motion of the bars 16, 18, i.e., the direction of rotation that would produce inward motion of the torsion bars if placed parallel on a rolling surface and brought together by rolling. Thus, it can be seen that clockwise and counterclockwise is determined from the orientation of the viewer being located at the motor assembly and facing toward wheels 12. Conversely, the second direction is defined as bar 16 being rotated in a counterclockwise fashion and bar 18 being rotated in the clockwise fashion. Accordingly, the second motion produces an outward rolling motion of bars 16, 18. It will be understood that the shown embodiment is illustrative and not restrictive in nature.

In this way, the suspension assembly 10 can either level changes in payload, or change at the object axle the target trim height of the sprung mass such as might be required to raise the sprung mass from a lowered entry position to a normal driving position, or from a normal driving position to a higher off road trim height. The motor assembly 36 may also include a brake to resist falling to a lower trim height under the force of the sprung mass after the desired trim height has been achieved.

Figure 3:
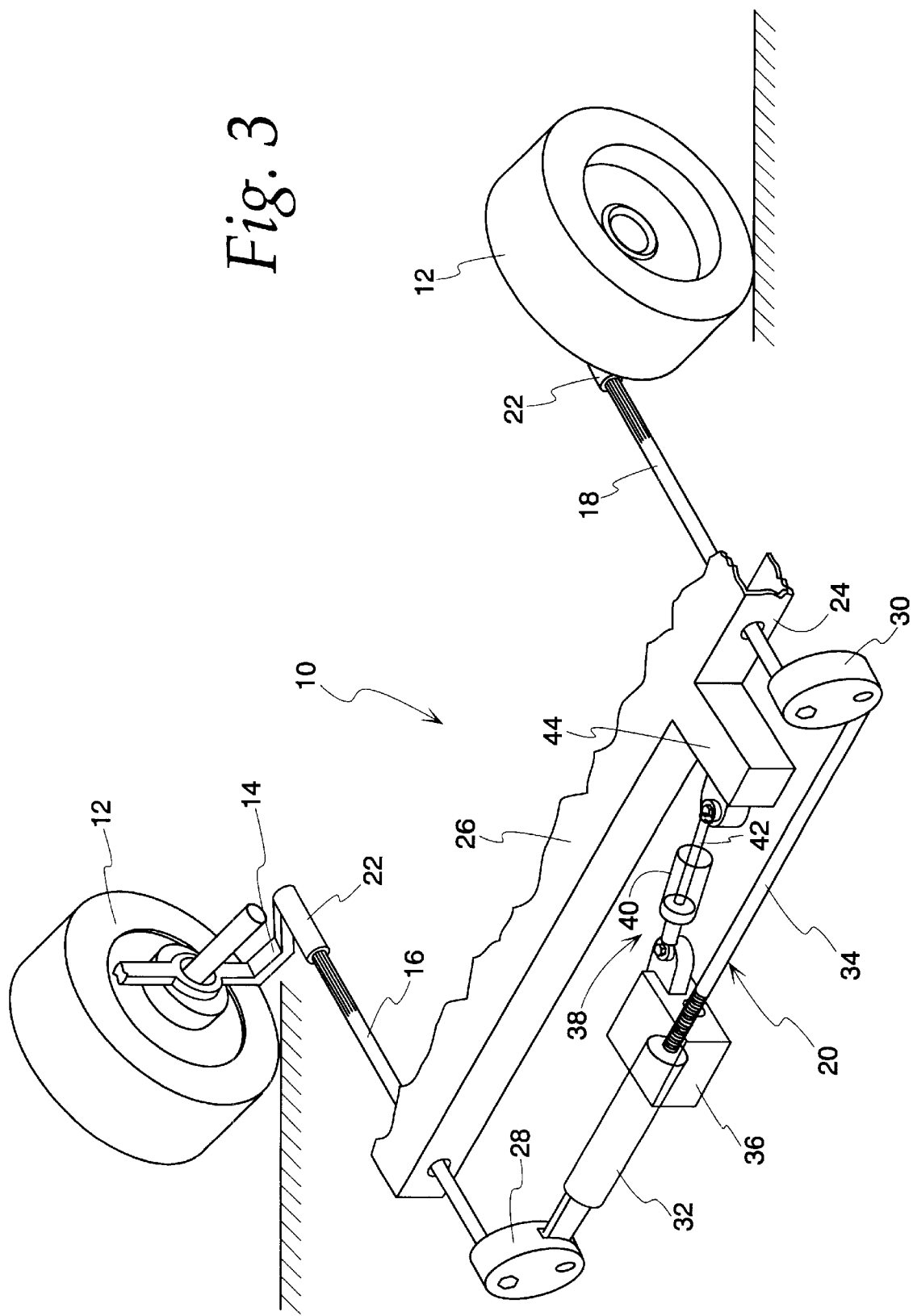
FIG. 3 is a schematic view of the suspension showing the vehicle executing a right-hand turn.

A roll actuator 38 is connected between the jack screw system 20 and the sprung mass 26. The roll actuator is preferably a hydraulic roll actuator, including a cylinder 40 pivotably connected to the motor assembly 36 and a piston 42 pivotably connected to a projection 44 on the sprung mass 26. The roll actuator 38 resists rolling forces developed by the vehicle when cornering. FIG. 3 shows the vehicle executing a right-hand turn. Assuming that the wheels 12 are the front wheels of the vehicle, a controller commands the roll actuator 38 to collapse, i.e. the piston 42 moves further into the cylinder 40. The jack screw rods 32 and 34 do not move relative to each other, and consequently the torque reaction arms 28 and 30 both pivot counterclockwise as shown. This in turn causes the torsion bars 16 and 18 to rotate counterclockwise, resisting the rolling forces of the turn by raising the sprung mass at the outer wheel and lowering the sprung mass at the inner wheel to help keep the vehicle level. Similarly, the roll actuator 38 extends to push the cylinder 40 and piston 42 farther apart, and rotate the torsion bars 16 and 18 in the opposite directions, when the vehicle is executing a left hand turn.

The suspension assembly 10 can of course be provided for the rear wheels of the vehicle as well. The suspension assembly of the present invention thus provides the ability to utilize separate power sources for the front and rear axles in a four-corner leveling suspension, where fast response is desirable, and where raising the sprung mass at both axles simultaneously is either required or desirable. The present invention also provides the ability to package the height and roll control actuator(s) remotely from the wheels, where more packaging space may be available. When conventional pneumatic or hydro-pneumatic systems are used for four-corner height control, a common power source is normally used for both the front and rear axle actuators. Due to various possible combinations of payload between the front and rear axles, it is difficult to maintain repeatable performance while leveling both axles simultaneously using a common power source that is pressure based, because the axle requiring less pressure will tend to raise first. This may be the rear axle in some circumstances, and the front axle in other circumstances. Furthermore, only one leveling actuator is required, and side-to-side leveling is accomplished with the roll control actuator.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A suspension for a motor vehicle having a pair of wheels, the suspension comprising:

a control arm connected to each wheel;

a torsion bar connected to each control arm, the torsion bar having a longitudinal axis and being rotatable about the longitudinal axis in first and second directions;

a height actuator connected between the torsion bars, the height actuator being operable to raise a sprung mass of the vehicle by rotating the torsion bars in the first directions, and to lower the sprung mass by rotating the torsion bars in the second directions; and a roll actuator connected between the height actuator and the sprung mass.

2. The suspension of claim 1 wherein the height actuator comprises a motor.

3. The suspension of claim 1 wherein the height actuator comprises an electric motor.

4. The suspension of claim 1 wherein the height actuator comprises a jack screw system.

5. The suspension of claim 1 wherein the roll actuator comprises a hydraulic roll actuator.

6. The suspension of claim 1 wherein the first direction includes an inward rotation of the torsion bars.

7. The suspension of claim 1 wherein the second direction includes an outward rotation of the torsion bars.

8. A suspension for a motor vehicle having a pair of wheels, the suspension comprising:

a control arm connected to each wheel;

a torsion bar connected to each control arm, the torsion bar having a longitudinal axis and being rotatable about the longitudinal axis in first and second directions;

a jack screw system connected between the torsion bars, the jack screw system being operable to raise a sprung mass of the vehicle by rotating the torsion bars in the first directions, and to lower the sprung mass by rotating the torsion bars in the second directions; and a roll actuator connected between the jack screw system and the sprung mass.

9. The suspension of claim 8 wherein the jack screw system comprises a motor.

10. The suspension of claim 8 wherein the jack screw system comprises an electric motor.

11. The suspension of claim 8 wherein the roll actuator comprises a hydraulic roll actuator.

12. The suspension of claim 8 wherein the first direction includes an inward rotation of the torsion bars.

13. The suspension of claim 8 wherein the second direction includes an outward rotation of the torsion bars.

14. A suspension for a motor vehicle having a pair of wheels, the suspension comprising:

a control arm connected to each wheel;

a torsion bar connected to each control arm, the torsion bar having a longitudinal axis and being rotatable about the longitudinal axis in first and second directions;

a jack screw system connected between the torsion bars;

a motor connected to the jack screw system, the motor being operable to raise a sprung mass of the vehicle by rotating the torsion bars in the first directions, and to lower the sprung mass by rotating the torsion bars in the second directions; and a roll actuator connected between the jack screw system and the sprung mass.

15. The suspension of claim 14 wherein the motor comprises an electric motor.

16. The suspension of claim 14 wherein the roll actuator comprises a hydraulic roll actuator.

17. The suspension of claim 14 wherein the first direction includes an inward rotation of the torsion bars.

18. The suspension of claim 14 wherein the second direction includes an outward rotation of the torsion bars.

* * * * *